United States Patent [19]

Throop

[11] 4,197,360

[45] Apr. 8, 1980

[54] MULTILAYER LAMINATE OF IMPROVED RESISTANCE TO FATIGUE CRACKING

[75] Inventor: Joseph F. Throop, Troy, N.Y.

[73] Assignee: The United States of America as represented by the Secretary of the Army, Washington, D.C.

[21] Appl. No.: 901,939

[22] Filed: May 1, 1978

[51] Int. Cl.² ............................................. B32B 15/00
[52] U.S. Cl. ................................... 428/651; 428/654; 428/660
[58] Field of Search ..................... 428/651, 654, 660

[56] References Cited

U.S. PATENT DOCUMENTS

| | | | |
|---|---|---|---|
| 2,785,451 | 3/1957 | Hanink | 428/651 |
| 2,903,785 | 9/1959 | Hanink et al. | 428/651 |
| 2,992,135 | 7/1961 | Finlay | 428/651 |
| 3,037,880 | 6/1962 | Hanink | 428/651 |
| 3,045,333 | 7/1962 | Finlay | 428/651 |
| 3,156,978 | 11/1964 | Hanink et al. | 428/651 |
| 3,233,312 | 2/1966 | Cowan et al. | 428/651 |
| 3,359,142 | 12/1967 | Ward, Jr. | 428/651 |
| 3,798,011 | 3/1974 | Sharp, Jr. | 428/651 |

*Primary Examiner*—L. Dewayne Rutledge
*Assistant Examiner*—W. G. Saba
*Attorney, Agent, or Firm*—Nathan Edelberg; Robert P. Gibson; A. Victor Erkkila

[57] ABSTRACT

A multilayer bi-metallic laminate of improved resistance to the initiation and propagation of fatigue cracking and fracture is obtained by intimately bonding, alternate sheets of the two metals one of the metals having a modulus of elasticity at least 20% greater than the other metal. Prior to the bonding step the sheets of the stronger metal are stretched so that when they are released after the bonding step they are left in a state of residual tension while the sheets of the weaker metal are left in a state of residual compression. The residual compression in the weaker metal inhibits fatigue cracking of the laminate while the residual tension in the stronger metal has little effect on the crack resistance thereof.

6 Claims, 6 Drawing Figures

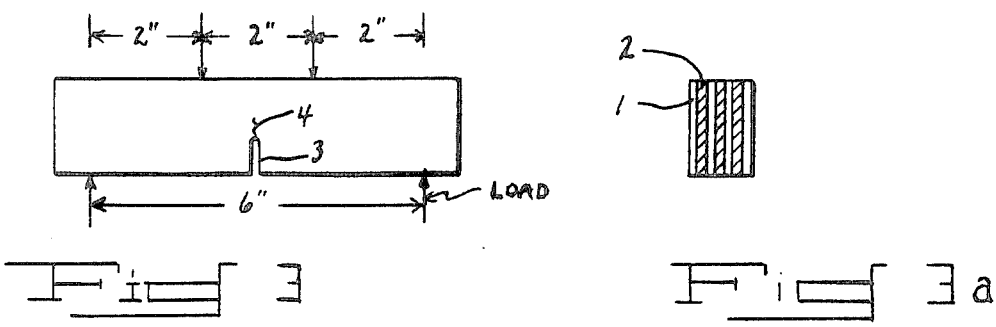
FIG. 3
FIG. 3a
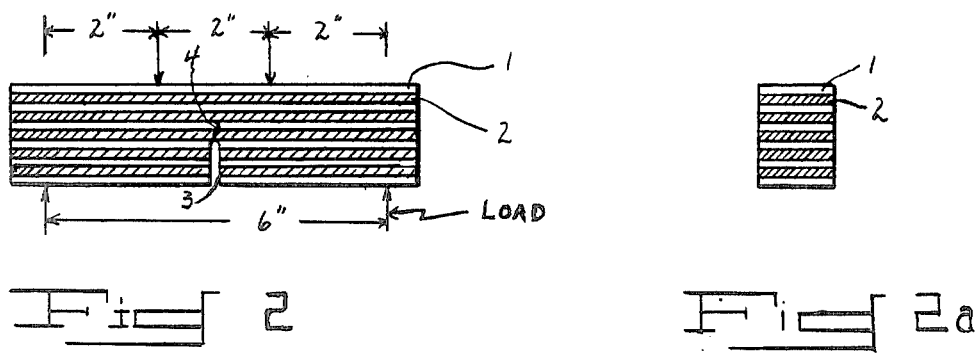
FIG. 2
FIG. 2a
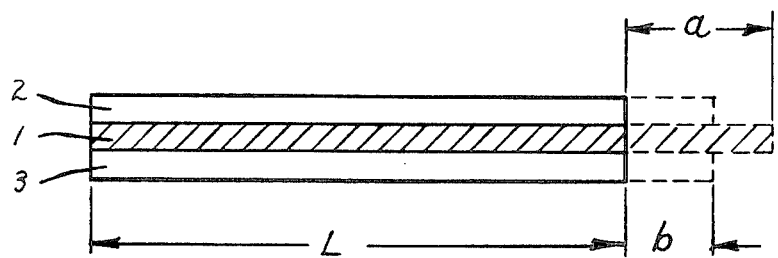
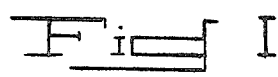
FIG. 1

MULTILAYER LAMINATE OF IMPROVED RESISTANCE TO FATIGUE CRACKING

GOVERNMENTAL INTEREST

The invention described herein may be manufactured, used and licensed by or for the government for governmental purposes without the payment to me of any royalties thereon.

BACKGROUND OF THE INVENTION

This invention relates to laminate structures and is more particularly directed to improving the resistance thereof to the initiation and propagation of fatigue cracking and to subsequent fracture.

Structural materials for military weapons and vehicles must possess a high level of resistance to fracture as well as the ability to sustain considerable impact damage without incurring the type of rapid fatigue crack propagation which leads to catastrophic failure. Accordingly, it has been proposed that the critical portions of military items be fabricated from composite laminates since the layered structure thereof increases the initial amount of impact energy which can be absorbed prior to the initiation of fatigue cracking while the interface surfaces of the individual layers act to retard the subsequent propagation of such cracking during cyclic loading. However, various attempts to develop laminates as a basic structural material for damage-prone military equipment have generally failed to gain wide acceptance since the resulting increase in crack resistance and the corresponding decrease in the rate of crack propagation have not been of sufficient extent to outweigh the greater cost generated by the increased complexity of manufacture of both the material and the end item fabricated therefrom.

SUMMARY OF THE INVENTION

Accordingly, it is a general object of this invention to provide a laminate structure capable of resisting the initiation and propagation of fatigue cracking to a far greater degree than that heretofore achieved.

It is a further object of the present invention to bond individual layers of material into a laminate structure in a manner which effectively introduces a desired degree and type of residual stress in each of the layers.

A more specific object of this invention is to provide a method for producing a laminate structure, wherein adjacent layers of dissimilar metals are alternately bonded in such a manner that the residual stresses in one layer are opposite to the residual stresses in an adjacent layer.

A further object of the invention is to provide a bonded laminate structure, wherein each layer of metal is provided with a desired amount of residual stress by selective control of the modulus of elasticity, thickness and other characteristics of the metal layers.

In accordance with the present invention these and other objects can be achieved by intimately bonding adjacent layers of dissimilar metals (which term includes pure metals as well as metal alloys), one of said metals having a modulus of elasticity at least 20% greater that the other of said metals. Prior to the bonding step the sheet(s) of the stronger metal are stretched while the sheet(s) of the weaker metal are stretched to a lesser extent or not at all, so that when such sheets are released after the bonding step, those of the stronger metal are left in a state of residual tension while the sheet(s) of the weaker metal are left in a state of residual compression. Once the equilibrium configuration of the layers is reached the residual compression in the weaker material serves to arrest, or at least retard, fatigue cracking while the residual tension in the stronger material has little effect on the crack resistance thereof. The fatigue performance of the laminate is superior to that of a similar solid piece of either component material per se, due to the residual compression in the weaker material which serves to retard or prevent fatigue cracking while the residual tension in the stronger material does not seriously affect its resistance to fatigue in the laminate. The weaker layers in residual compression serve as crack arrest layers between the stronger layers. Because of the residual compression stress therein, the weaker layers require a higher loading to initiate cracking and provide greatly increased longevity under fatigue loading than would be otherwise endured. A laminate made up of two or more concentric tubular layers, or an odd number (3 or more) of sheet layers, in this condition is self-equilibrating.

BRIEF DESCRIPTION OF THE DRAWINGS

FIG. 1 illustrates a laminate of three sheets, wherein the central sheet is the tension member and the two sheets bonded thereto are the compression members.

FIG. 2 illustrates a notched laminate beam, obtained by bonding alternate sheets of aluminum alloy and titanium alloy according to the present invention, showing a fatigue crack in crack arrest orientation.

FIG. 2a is a transverse section view of the laminate shown in FIG. 2.

FIG. 3 illustrates a notched laminate beam, obtained by bonding alternate sheets of aluminum alloy and titanium alloy according to the present invention, showing a fatigue crack in crack divider orientation.

FIG. 3a is a transverse section view of the laminate shown in FIG. 3.

DETAILED DESCRIPTION OF THE INVENTION

Figure 4:
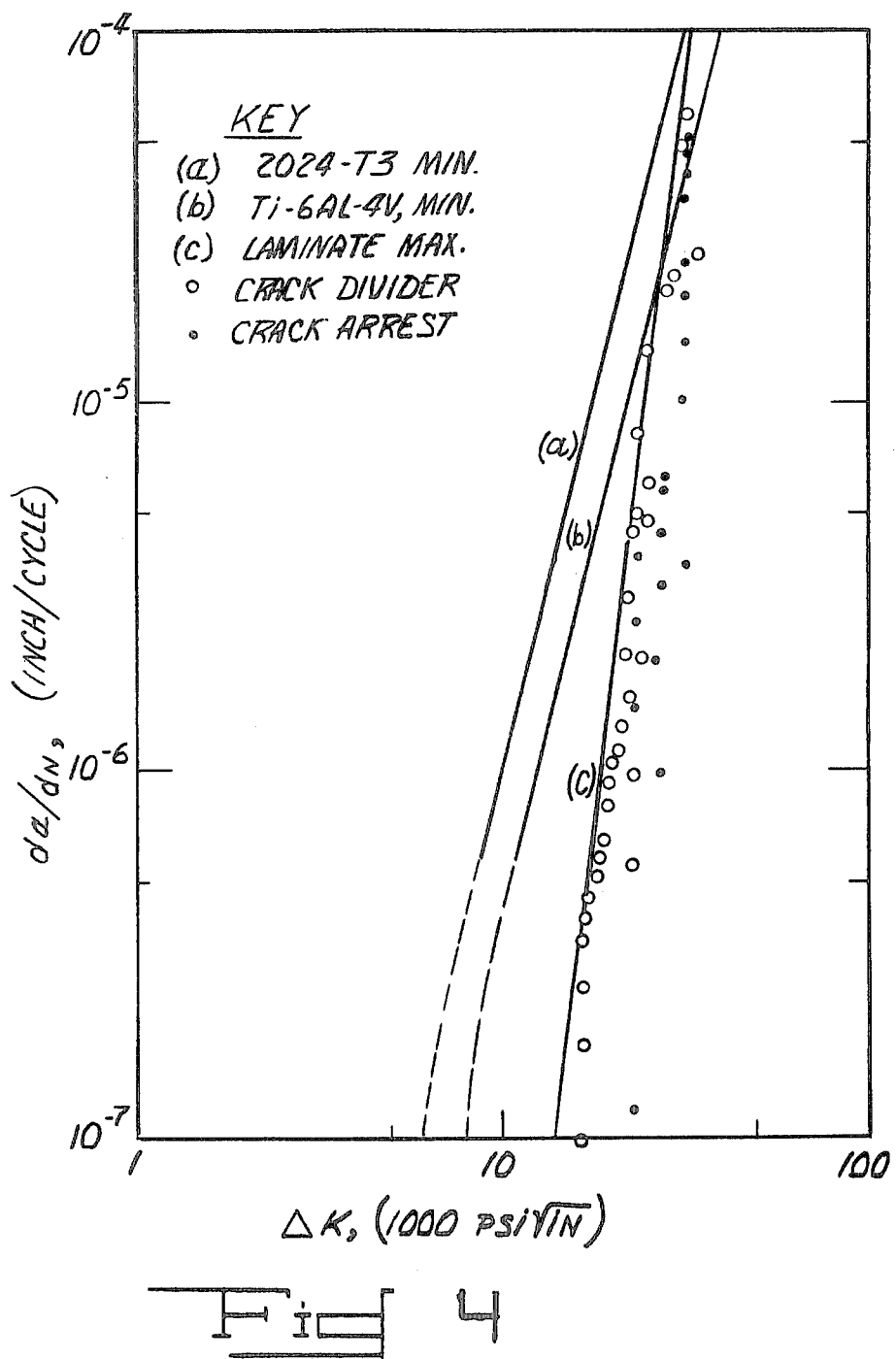
FIG. 4 illustrates a graphical representation of the relationship between fatigue crack propagation rate and fracture mechanics stress intensity factor range for laminate beams of the type shown in FIGS. 2 and 3 and for corresponding beams of the component aluminum alloy and the titanium alloy.

The novel bonded laminates can be prepared by any bonding process as long as there is produced the desired state of alternate layers of residual compression and residual tension with the residual compression in the metal of lower elastic modulus. Suitable processes include adhesive bonding, e.g. with epoxy adhesives, furnace brazing, diffusion bonding, hot roll bonding etc. The laminates can be engineered to give a composite of desired density, elastic modulus, yield strength, fracture toughness and/or other properties by use of the principles of mechanics, elasticity and fracture mechanics and by judicious choice of volume proportions of the two materials.

The preferred bonding method employed for fabricating the novel laminates of the present invention comprises explosively bonding adjacent layers of the dissimilar metals. Explosive bonding of metals is well known in the art, and is described for example in U.S. Pat. No. 3,137,937. To prepare a laminate of this invention by explosively bonding adjacent sheets of dissimilar metals, it is necessary that one of the metals has a 10% greater density as well as a 20% greater elastic modulus than the other metal. During the explosive bonding operation a greater stretch is imparted to the metal of greater density, which leaves it in a state of residual tension while the lighter metal of lower elastic modulus is left in a corresponding state of residual compression.

As illustrated in FIG. 1, when a laminate of the present invention is made by the explosive bonding method, the central sheet 1 of metal due to its greater density is stretched by an elastic amount "a", which is greater than the simultaneous stretch "b" of the two outer sheets 2 and 3 of lower density and elastic modulus. These deformations are maintained during the process while the two outer sheets are bonded to the central sheet all over the surfaces of contact, after which the laminate recovers elastically to a self-equilibrated condition. If the outer strips are alike the laminate will remain straight. If straightening is required after bonding it can be assisted by a controlled furnace heat treatment, which should be done so as to retain as much as possible of the aforesaid alternating states of residual stress in the layers.

Whether the laminate is made by the explosive bonding method or other suitable bonding process, e.g. adhesive bonding or hot roll bonding, tensile residual stress will result in the sheets of metal of greater elastic modulus and compression stress will be the residual stress in the sheets of metal of lower elastic modulus when they acquire their equilibrium configuration. This situation is similar to a prestressed concrete beam or bridge wherein the concrete is put in compression by imposing tension in steel bolts or cables through the structure. In this laminate the central strip becomes the tension member and the two bonded strips become the compression members. If the outer strips are alike the laminate will remain straight. The theory for calculating the stresses and changes in length for elastic behavior with different materials is explained in the chapter entitled "Statically Indeterminate Structures": in the book *Statics and Strength of Materials* by Roland H. Trathen, John Wiley & Sons, N.Y. (1954), Library of Congress 54:5429 pp 284–293.

The equations for the example in FIG. 1 are:

$$\sigma_T A_T + \sigma_A A_A = 0$$

and $$(\sigma_T/E_T) - (\sigma_A/E_A) = \epsilon_T - \epsilon_A$$

where $A_T$, $\sigma_T$ and $E_T$ are the cross-sectional area, the residual tensile stress and the elastic modulus of the high modulus material, $A_A$, $\sigma_A$ and $E_A$ are the cross-sectional area, the residual compression stress and the elastic modulus of the low modulus material respectively and $\epsilon_T$ and $\epsilon_A$ are the initial unit strains of the two materials at the time of bonding. For equal thicknesses of Ti-6Al-4V and 2024-T3 alloy sheets of equal width in the example, if the initial unit strain in the Titanium is 0.002 inch/inch greater than the initial unit strain in the Aluminum the residual stresses are $\sigma_T = 18,500$ psi tension and $\sigma_A = 9,250$ psi compression.

The average shearing stress in the bond at the interface between the central layer and the outer layer is given by:

$$\tau = (\sigma_T t_T)/L = (2\sigma_A t_A)/L$$

where $\tau$ is the interlaminar shear stress, $t_T$ and $t_A$ are the thicknesses of the high modulus material and the low modulus material respectively and L is the length of the assembly as shown in FIG. 1.

PREPARATION OF A MULTILAYER LAMINATE

A laminate, such as illustrated in FIGS. 2 and 3, was prepared consisting of layers of 2024-T3 Alclad, 1 (an aluminum alloy sheet coated on both sides by a thin layer of essentially pure aluminum) interspersed with layers of a titanium alloy 2, consisting of 90% T., 6% Al and 4% V. The Alclad 2024 and Titanium alloy sheets used were 10 in. (254 mm)×16 in. (406 mm)×0.08 in. (2 mm) thick. Because of the difference in density and nature of the two metals being welded (as well as thickness of the sheets when different thicknesses were employed) the optimum method used was to weld two layers per operation with the aluminum layer being the top layer adjacent to the explosive and the titanium alloy layer being the intermediate layer above the aluminum base layer to which it is being welded.

The laminate was prepared by placing the initial base component, the Alclad 2024-T3 sheet, on a supporting base consisting of a steel anvil (not shown). Next a sheet of the titanium alloy was placed over the base sheet and a sheet of the Alclad 2024 was placed over the sheet of titanium alloy with a standoff distance of 0.09 in. (2.3 mm) between all sheets. A 0.5 in. (12.7 mm) thick sheet of SWP-1 explosive (an ammonium nitrate-nitrostarch base explosive of low velocity 2000–3000 meters per second, manufactured by Trojan U.S. Powder Co., a Division of Commercial Solvents Corp.) was placed over the top sheet of the stack and a 0.06 in. thick shield of stainless steel was placed around the sides of the explosive layer and sheets. The sheets were then explosively bonded as a pair to the base sheet and to each other. Thereafter, the process was repeated by superposing a sheet of the titanium alloy and a sheet of the Alclad 2024 as a pair on the base component consisting of the previously bonded laminate on the steel anvil and explosively bonding the sheets as a pair simultaneously to each other and to the previously bonded laminate. A total of 10 bonding operations was performed, which resulted in a laminate of 21 layers with a thickness of 0.75 in. (19 mm). Residual stresses were induced in the laminate because the titanium sheets have different density and elastic modulus than the aluminum sheets and are therefore accelerated and stretched differently during the explosive bonding which welds the sheets together. Upon coming to rest after the bonding, the titanium layers were left in a state of residual tension and the aluminum sheets were left in a state of residual compression. Some bowing of the panels occurred during the bonding process, and straightening or flattening was required after each bonding operation.

X-ray diffraction stress measurements in the 21 layer laminate produced in the foregoing manner showed tension in the titanium alloy layers and compression in the aluminum alloy layers. The values ranged from 9,400 to 23,400 psi tension in the titanium alloy layers and 4,100 to 18,500 psi compression in the aluminum alloy layers. The average tension residual stress in the titanium alloy layers was 15,300 psi and the average compression residual stress was 13,400 psi in the aluminum alloy layers, with the low value of 4,100 psi compression being in the last deposited layer of aluminum alloy sheet. The values and kinds of residual stresses in the alternate layers were confirmed by sectioning and strain gage measurements to assure that they were actually alternating compression and tension stresses. It is clear from equilibrium considerations that, in a multilayer laminate of equal thickness layers, the larger the number of layers the more nearly the alternate compression and tension residual stresses will tend to equal each other in magnitude, except possibly at the outer layers.

TESTING OF THE LAMINATE

Fatigue crack growth and fracture toughness were measured by 4 point bending notched beam specimens of the laminate in two different orientations, viz. the crack arrest orientation as indicated in FIG. 2 and the crack divider orientation as indicated in FIG. 3. The beam specimens were 0.75 in. (19 mm) thick, 1.5 in. (38 mm) wide, and 8 in. (203 mm) long. The crack arrest test results were obtained from 21 layer laminate specimens. The crack divider test results were obtained from 10 layer laminate specimens produced in the same manner except that the final top layer bonded imperfectly and was removed. In the fatigue tests of the crack divider configuration the beams were notched to a depth of about 0.4 in. (10 mm) and then loaded in pure bending, as indicated in FIG. 2 for the crack divider configuration and FIG. 3 for the crack arrest configuration, so as to produce tension at the notch 3 and cause precracking, ie., the crack 4 to propagate from the notch. In the crack arrest specimen the notch 3 was machined so that some cyclic crack propagation could occur in the lamina before the crack would reach an interface. Some specimens were tested with the initial crack in a titanium alloy layer and others with the crack in an aluminum alloy layer.

The specimens were cycled from zero to maximum load in pure bending at 30 hertz in a fatigue machine. The loading was applied so as to produce tension at the notch, and the crack growth was measured periodically with graduated microscopes reading to 0.002 in. (0.05 mm).

After the fatigue cracks were propagated to the desired depth, the specimens were tested for fracture toughness according to standard ASTM procedures.

FATIGUE TEST RESULTS

In the crack divider orientation, wherein the fatigue crack advances edgewise into all of the layers simultaneously, the fracture toughness values varied from 45,300 to 62,500 psi $\sqrt{\text{in}}$ with the average being 53,800 psi $\sqrt{\text{in}}$. These values compare with the published representative values of 26,500 psi $\sqrt{\text{in}}$ for the 2024-T3 aluminum alloy and 47,000 psi $\sqrt{\text{in}}$ for the annealed Ti-6Al-4V titanium alloy. Thus, the values for the laminate average 114% to 203% of those for the component materials.

Similarly, in the crack arrest orientation, wherein the fatigue crack advances through one layer after another perpendicular to the layers, when the crack was advanced through the titanium alloy layer to the interface with the next aluminum alloy layer, the fracture toughness values varied from 24,800 to 44,500 psi $\sqrt{\text{in}}$, with an average of 34,500 psi $\sqrt{\text{in}}$. When the crack was advanced through an aluminum alloy layer to the interface with the next titanium layer, the values varied from 66,400 to 72,300 psi $\sqrt{\text{in}}$ with an average value of 69,500 psi $\sqrt{\text{in}}$. Thus, for this orientation the fracture toughness values averaged 130% to 262% of the representative value for 2024-T3 aluminum alloy and from 73% to 148% of the representative value for the Ti-6Al-4V titanium alloy. Further, in this orientation when the crack reaches the interface, it ceases to advance into the next layer, partial delamination of the interface occurs gradually and bending of the specimen progresses gradually, whereby a large amount of energy is absorbed in the deformation process without catastrophic fracture. This indicates that the laminate possesses a much larger damage tolerance than possessed by solid 0.75-1 inch thick plates of either the 2024-T3 aluminum alloy or the Ti-6Al-4V titanium alloy.

During the fatigue precracking the rate of fatigue crack propagation was measured in each specimen so as to obtain the relationship between fatigue crack propagation rate da/dN and the fracture mechanics stress intensity factor range $\Delta K$. The laminate specimens thus produced and tested gave fatigue crack propagation rates equal to or less than that expressed by the following equation $$da/dN \leq 5.845 \times 10^{-17} \Delta K^{8.056}$$

for $\Delta K$ between 16 and 32 ksi $\sqrt{\text{in}}$, and da/dN between $10^{-7}$ in. per cycle and $10^{-4}$ in. per cycle. There also appeared to be a threshold at $\Delta K$ between 16 to 18 ksi $\sqrt{\text{in}}$. below which the fatigue rate may be considered to be negligable.

FIG. 4 shows a graph of the fatigue crack propagation rate da/dN plotted against $\Delta K$ on log-log scales. The graph sets forth a comparison of the minimum fatigue crack propagation rates for the component materials published in the technical literature.

(a) $da/dN \leq 1.0 \times 10^{-10} \Delta K^4$ for 2024-T3 aluminum alloy and (b) $da/dN \leq 4.0 \times 10^{-11} \Delta K^4$ for Ti-6Al-4V (annealed) titanium alloy (summarized in the Battelle Damage Tolerant Design Handbook on pages 8.1-14 (12/72), 8.1-19 (9/73) and 8.1-20 (9/73) for the 2024-T3 aluminum alloy and pages 8.4-7 (12/72), 8.4-8 (1/75) and 8.4-102 (1/75) for the annealed Tl-6Al-4V alloy), with the maximum crack propagation rates for the tested laminates (c) $da/dN \leq 5.845 \times 10^{-17} \Delta K^{8.056}$ FIG. 4 shows that the laminates possessed crack propagation rates lower than either the aluminum alloy or the titanium alloy. While this exponent expresses a very rapid increase in da/dN with increasing $\Delta K$, it does not exceed the rates of either of the component alloys until $\Delta K$ exceeds 32 ksi $\sqrt{\text{in}}$., where the crack rate becomes greater than $3 \times 10^{-5}$ in. per cycle.

From the foregoing it is evident that because of the apparent high threshold value of $\Delta K$ and the crack propagation rates measured from $\Delta K$ of 16 to 32 ksi $\sqrt{\text{in}}$., the laminate has a slower fatigue crack propagation rate than either of the component alloys and therefore should give longer fatigue life of notched or cracked structural parts. This can be attributed to the compression residual stress in the alternate aluminum layers of the laminate. The test results indicate that this laminate is a superior fatigue resistant and damage tolerant material suitable for use in structural parts, eg. of aircraft, helicopters, ships and land vehicles.

Laminates of similar properties were made by bonding sheets of the foregoing alloys in similar manner using sheet thickness ratios of Alclad 2024 to titanium alloy ranging from 4:1 to 1:4, including the following specific combinations:

(a) 0.190 in. thick Alclad 2024-T3 sheets interspersed with 0.045 in. thick titanium alloy sheets,
(b) 0.031 in. thick Alclad 2024-T3 sheets interspersed with 0.120 in. thick titanium alloy sheets.

In addition to the specific metal combinations illustrated above, other combinations of two different metals can be bonded according to the process of the present invention to produce the novel bimetallic laminates of superior resistance to fatigue cracking and fracture, including the following combinations: aluminum and titanium, aluminum and steel, aluminum and magnesium, and steel and copper.

The foregoing disclosure and drawings are merely illustrative of the principles of this invention and are not to be interpreted in a limiting sense. I wish it to be understood that I do not desire to be limited to the exact details of construction shown and described, because obvious modifications will occur to a person skilled in the art.

What is claimed is:

1. A multilayer laminate comprising at least three alternate layers of a first metal and a second metal in contiguous bonded relationship wherein
   (a) said first metal has an elastic modulus at least 20% greater than said second metal, and
   (b) the layers of said first metal possess residual tensile stresses and the layers of said second metal possess residual compressive stresses produced by the tensile stresses in the layers of said first metal,
   said compressive stresses being effective to resist fatigue cracking and retard propagation of fatigue cracks.

2. A multilayer laminate according to claim 1, wherein said first metal additionally has at least a 10% greater density than said second metal.

3. A laminate according to claim 2, wherein said first metal consists of titanium or alloy thereof and said second metal consists of aluminum or alloy thereof.

4. A laminate according to claim 3, wherein said first metal consists of 2024-T3 aluminum alloy clad with aluminum and said second metal consists of a titanium alloy composed of 90% Ti, 6% Al and 4% V.

5. A laminate according to claim 4, wherein the layers of said aluminum alloy are of the same thickness and the layers of said titanium alloy are of the same thickness, and wherein the thickness ratio of the aluminum alloy layers to the titanium alloy layers ranges about from 4:1 to 1:4.

6. A multilayer laminate according to claim 1, wherein the layers of said first metal are of the same composition and the layers of said second metal are of the same composition.

* * * * *